(12) United States Patent
Gilbert (10) Patent No.: US 7,079,143 B2
(45) Date of Patent: Jul. 18, 2006

(54) WAVEFORM DRAWING SYSTEM AND METHOD

(75) Inventor: Harry M. Gilbert, Portage, MI (US)

(73) Assignee: SPX Corporation, Charlotte, NC (US)

( * ) Notice: Subject to any disclaimer, the term of this patent is extended or adjusted under 35 U.S.C. 154(b) by 307 days.

(21) Appl. No.: 10/279,989

(22) Filed: Oct. 25, 2002

(65) Prior Publication Data

US 2004/0080511 A1    Apr. 29, 2004

(51) Int. Cl.
*G06T 11/20* (2006.01)

(52) U.S. Cl. ............... 345/441; 345/440.1; 327/106; 702/67; 702/70; 702/71; 708/272

(58) Field of Classification Search .............. 345/441; 327/106; 702/67, 70, 71; 708/272
See application file for complete search history.

(56) References Cited

U.S. PATENT DOCUMENTS 5,488,698 A * 1/1996 Oliver et al. ............... 358/1.11

OTHER PUBLICATIONS

Science Daily [online], Retrieved from the Internet: <URL:http://www.sciencedaily.com/encyclopedia/logic_gate_1>, [Retrieved on Feb. 18, 2005].*
Marc Weber, Marc Alexa & Wolfgang Muller, 2001, Visualizing Time-Series on Spirals, Retrieved from the Internet: <URL:http://www.dgm.informatik.tu-rmstadt.de/pub/spiral.pdf#search='spiral%20graph%20display'>, [Retrieved Feb. 22, 2005].*

* cited by examiner

*Primary Examiner*—Richard Hjerpe
*Assistant Examiner*—G. F. Cunningham
(74) *Attorney, Agent, or Firm*—Baker & Hostetler LLP (57) ABSTRACT

A waveform drawing routine is disclosed that includes receiving an array of predecessor image data points, wherein the predecessor image data points form a predecessor line that has a predecessor high end point and a predecessor low end point, receiving an array of successor image data points, wherein the successor image data points form a successor line having a successor high end point and a successor low end point, comparing the successor line to the predecessor line, and maintaining any portions of the predecessor line on a display that intersect with the successor line. The method described above for drawing each line segment that forms the waveform is repeated until a complete waveform is drawn on the display that consists of the concatenation of these individual lines.

23 Claims, 5 Drawing Sheets

FIG. 3A — Segment begins and ends above old segment
Old Segment
Action:Erase
Action:Draw FIG. 3B — New segment begins and ends below old segment
Old Segment
Action:Erase
Action:Draw
New Segment

FIG. 3C — New stripe begins at bottom of old stripe, ends above old stripe
Old Segment
Action:Draw
New Segment FIG. 3D — New stripe begins at bottom of old stripe, ends within old stripe
Old Segment
Action:Erase
New Segment

FIG. 3E

Old and new stripe coincide
Old Segment
Action:None
New Segment

FIG. 3F

New stripe begins below old stripe, ends at top point of old stripe
Old Segment
Action:Draw
New Segment

FIG. 3G

New stripe begins below old stripe, ends above old stripe
Old Segment
Action:Draw 2
New Segment

FIG. 3H

New stripe begins below old stripe, ends within old stripe
Old Segment
Action:Erase
Action:Draw
New Segment

New stripe begins within old stripe, ends at top of old stripe
Old Segment
Action:Erase
New Segment

FIG. 3I

New stripe begins within old stripe, ends above of old stripe
Old Segment
Action:Erase
New Segment

FIG. 3J

New stripe begins and ends with old stripe
Old Segment
Action:Erase 2
New Segment

FIG. 3K

WAVEFORM DRAWING SYSTEM AND METHOD

FIELD OF THE INVENTION

The present invention relates generally to waveform animation. More particularly, the present invention is directed to a system and method for implementation of a waveform drawing routine.

BACKGROUND OF THE INVENTION

Digital waveform drawing is a technique that is utilized to display data, for example measurements related to the performance of a system, over a period of time. The technique involves digitally plotting pixels, which correspond to the data, in a waveform on a screen of a display.

It is often desirable to continuously display data received over several periods of time. However, the screen of the display is limited in size and after a waveform has been displayed for a certain period of time, the waveform has to be replaced to reflect the data received from a subsequent period of time.

Software programs are utilized to determine which pixels should be digitally plotted, such that the data appears on the screen of a display as part of a continuous waveform. However, processors, which perform the numerous, complex and involved logical and arithmetic operations required by the software programs to determine what pixels should be plotted, tend to operate significantly faster than the display screen can respond. The difference in speed between the processor and the response rate of the display may cause screen flicker to occur.

Screen flicker refers to the phenomenon that occurs whereby the screen of a display appears to flicker during the process of erasing an existing waveform on the screen and drawing the next waveform on the display screen.

One conventional method of waveform drawing involves creating a blank display area by erasing either the image on the screen or the full display screen, and drawing the next image to be displayed. A technique referred to as page flipping or background display buffering is sometimes utilized to reduce screen flicker. Page flipping involves storing the image being processed in a buffer while the waveform on the display is being shown, and displaying the next waveform from the buffer after it has been fully created.

However, independent of whether the conventional method of waveform drawing is employed alone, or in conjunction with page flipping, the process of creating a blank display area can slow down animation operations, and result in redundant plotting of pixels.

Accordingly, it would be desirable to provide a method of waveform drawing that may avoid the redundant plotting of pixels, and increase the speed of animation operations. It would also be desirable to provide a method of waveform drawing that may avoid a significant number of complex logical and arithmetic operations.

SUMMARY OF THE INVENTION

In one aspect of the invention, a method for waveform drawing is provided that includes receiving an array of predecessor image data points, wherein the predecessor image data points form a predecessor line defined by a predecessor high end point and a predecessor low end point, receiving an array of successor image data points, wherein each the successor image data points forms a successor line that is defined by a successor high end point and a successor low end point, comparing the successor line to the predecessor line and maintaining any portions of the predecessor line on a display that intersect with the successor lines. The result of the drawing of these lines is a complete waveform drawn on the display consisting of the concatenation of these individual lines.

In another aspect of the invention, an apparatus for waveform drawing is provided that includes a predecessor image data points array receiver, wherein each of the predecessor image data points forms a predecessor line that is defined by a predecessor high end point and a predecessor low end point, a successor image data points array receiver in communication with the predecessor image data points array receiver, wherein the successor image data points form a successor line that is defined by a successor high end point and a successor low end point, a comparator in communication with the predecessor image data points array receiver and the successor image data points array receiver that compares the successor line to the predecessor line, and an eraser in communication with the comparator that erases any portions of the predecessor line that do not intersect with the successor line.

In another aspect of the present invention, a system for waveform drawing is provided that includes a means for receiving an array of predecessor image data points, wherein the predecessor image data points form a predecessor line defined by a predecessor high end point and a predecessor low end point, a means for receiving an array of successor image data points, wherein the successor image data points form a successor line defined by a successor high end point and a successor low end point, comparing the successor line to the predecessor line and maintaining any portions of the predecessor line on a display that intersect with the successor line.

In yet another aspect of the present invention, a method for waveform drawing is provided that includes receiving an array of predecessor data points that correspond to plotted pixels of an existing waveform on a display, receiving an array of successor data points that correspond to pixels to be plotted of a successor waveform that will succeed the existing waveform on the display, and determining through comparisons between the predecessor data points and the successor data points which of eleven possible sequences of plotting and/or erasing pixels results in the modification of the least number of pixel positions to produce the successor waveform through modifications to the predecessor waveform.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 3(*a*)–(*k*) illustrate the drawing and erasing operations performed by a waveform drawing routine in accordance with the present invention.

DETAILED DESCRIPTION OF PREFERRED EMBODIMENTS

Figure 1:
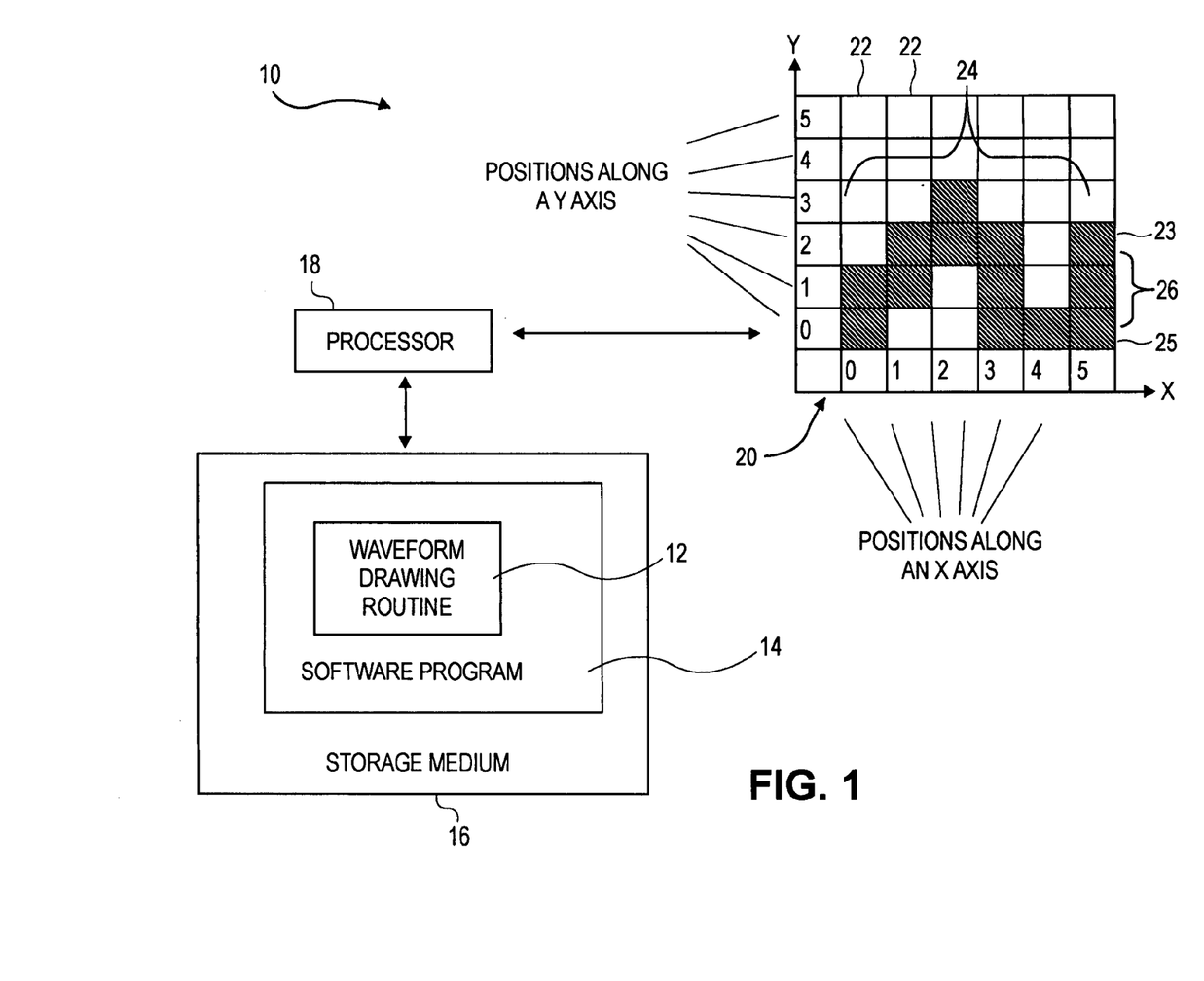
FIG. 1 is a block diagram of a system for waveform drawing in accordance with the present invention.

Referring now to the figures, wherein like reference numerals indicate like elements, in FIG. 1, there is shown a preferred embodiment of a system for drawing a waveform, in accordance with the present invention. The system 10 includes a waveform drawing routine 12, which may be a part of a larger software program 14, a storage medium 16, a processor 18, and a display 20. The software program may be stored on a storage medium 16 that is, for example, a diskette, a hard disk drive, a compact disc (CD), a random access memory device and/or a read-only memory device.

The display 20 includes a grid of pixels 22 where a waveform 24 may be displayed. The waveform 24 is the result of a series of lines that have been plotted, such as line 26. Each line has a high end point and a low end point, and is located at a position along an axis. For example, the high end point of line 26, which corresponds to element 23, is two and the low end point which corresponds to element 25 is zero, and line 26 is drawn at position five on the X-axis. Together, the sum of all the lines, shown on the display in FIG. 1, which are at positions zero through five along the X-axis, form the resultant waveform 24.

The waveform drawing routine of the present invention is utilized to produce, on a display 20, a digitized waveform 24 from an array of data points. In the drawing of a waveform that will succeed the waveform present on the display 20, the waveform drawing routine 12 of the present invention avoids redundant plotting of pixels that exist in the waveform that is present on the display 20, by comparing the plotted pixels of the waveform on the display to the pixels to be plotted for the waveform that will succeed the waveform on the display. For descriptive purposes, the waveform that is first displayed on the display is referred to as the predecessor image, and the waveform that will replace the predecessor image is referred to as the successor image.

Accordingly, the image drawing routine of the present invention, may reduce the number of pixel plotting/animation operations that have to be performed, and will eliminate the need to fully erase the display before plotting the successor image. Thus, screen flicker is eliminated.

Figure 2:
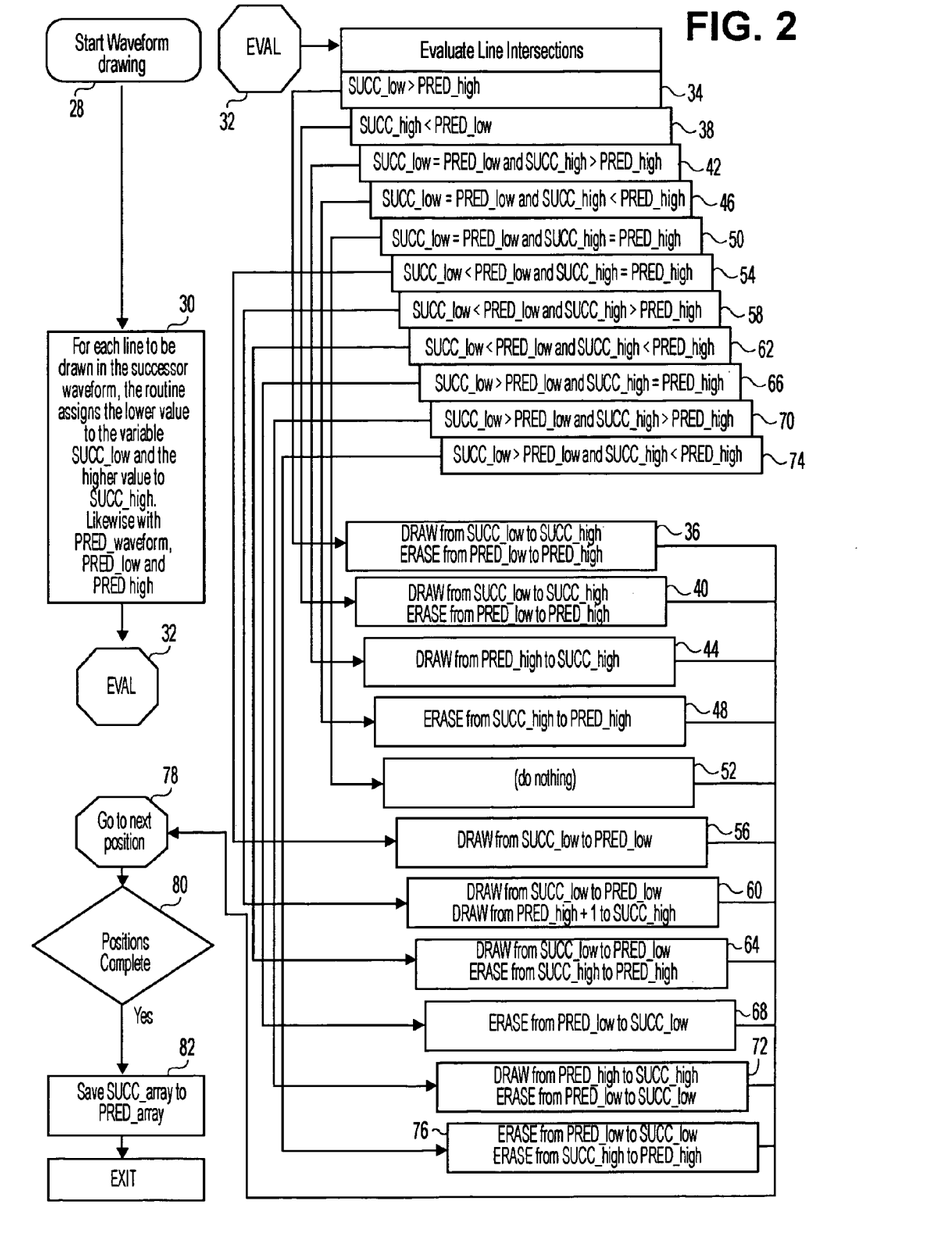
FIG. 2 is a flow chart of a method for waveform drawing in accordance with the present invention.
Figure 3A:
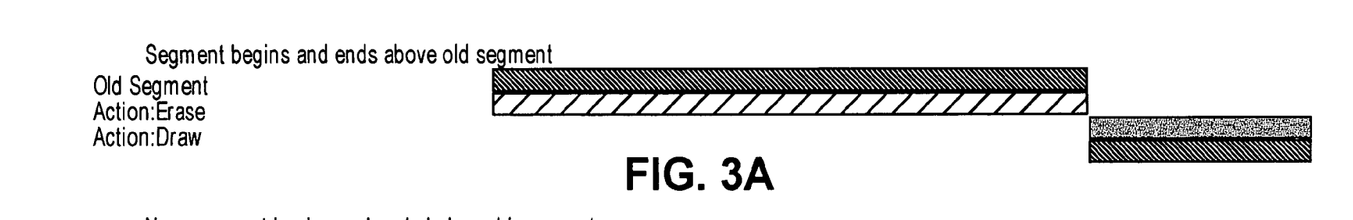
Figure 3B:
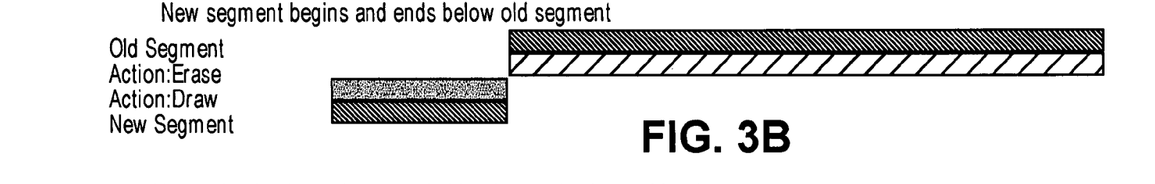
Figure 3C:
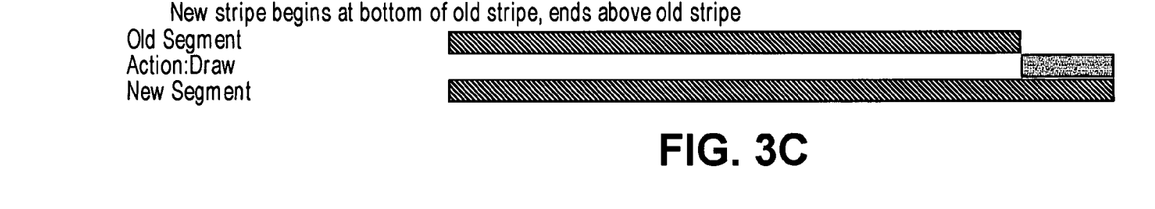
Figure 3D:
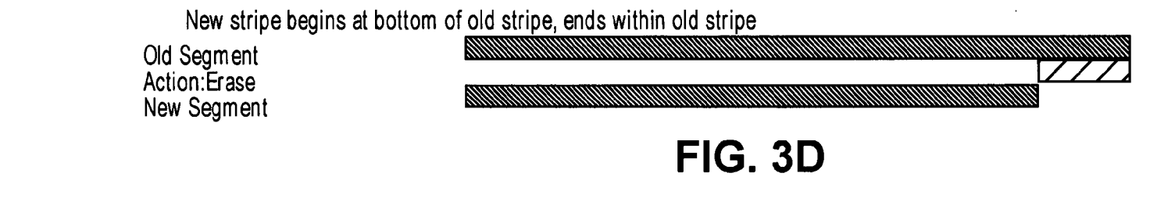
Figure 3E:
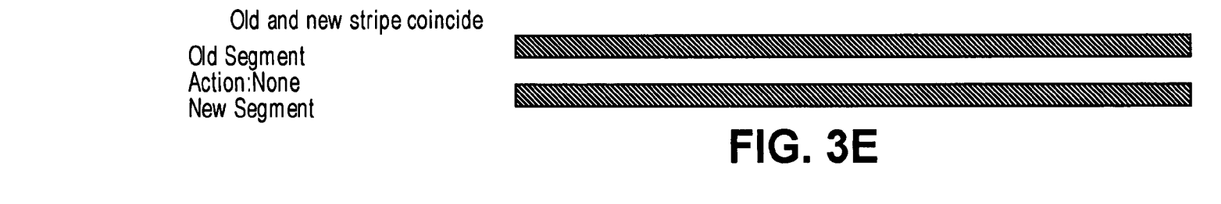
Figure 3F:
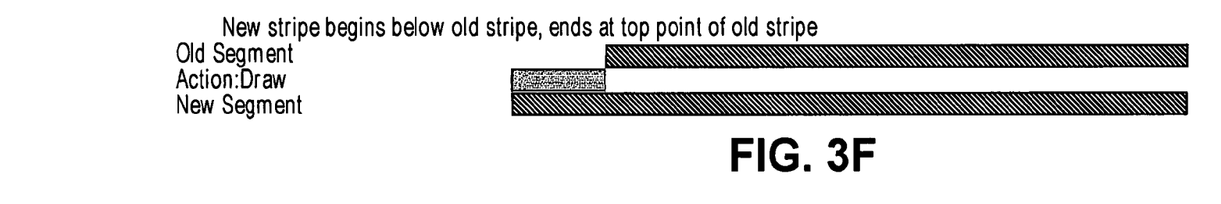
Figure 3G:
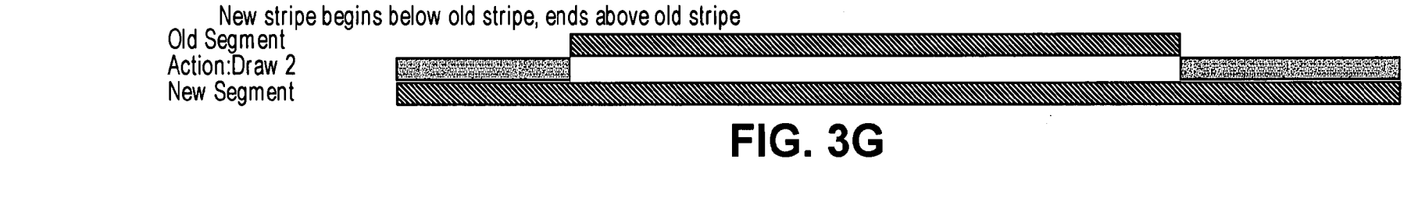
Figure 3H:
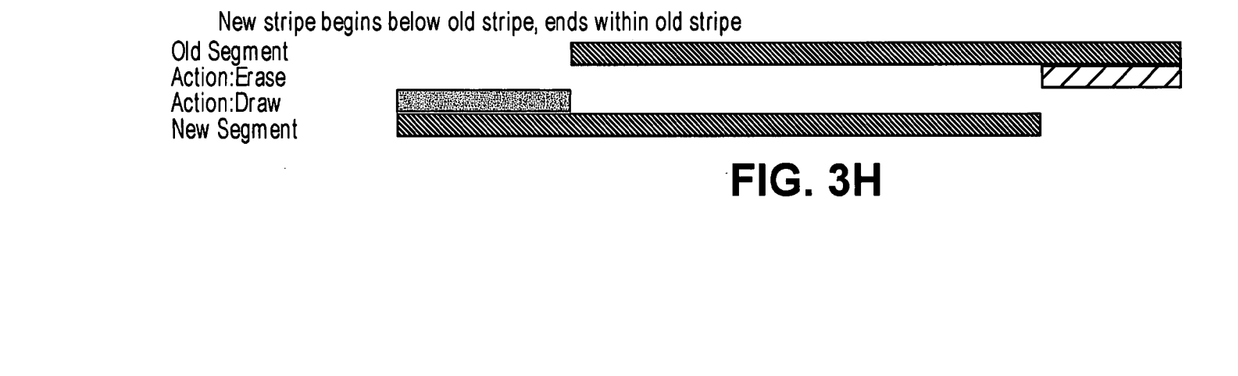
Figure 3I:
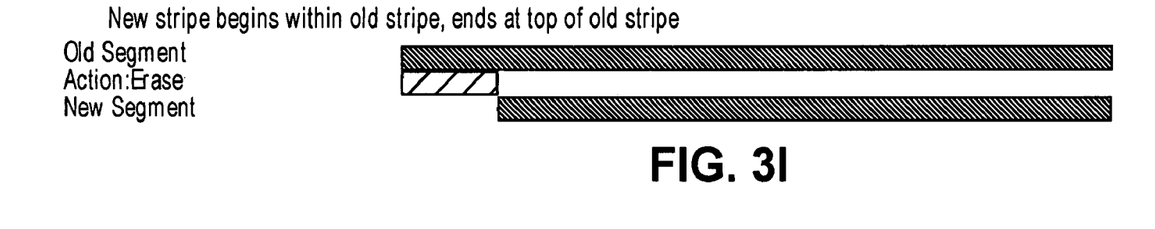
Figure 3J:
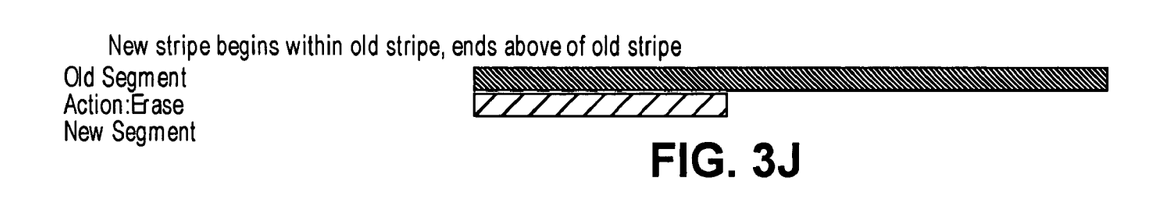
Figure 3K:
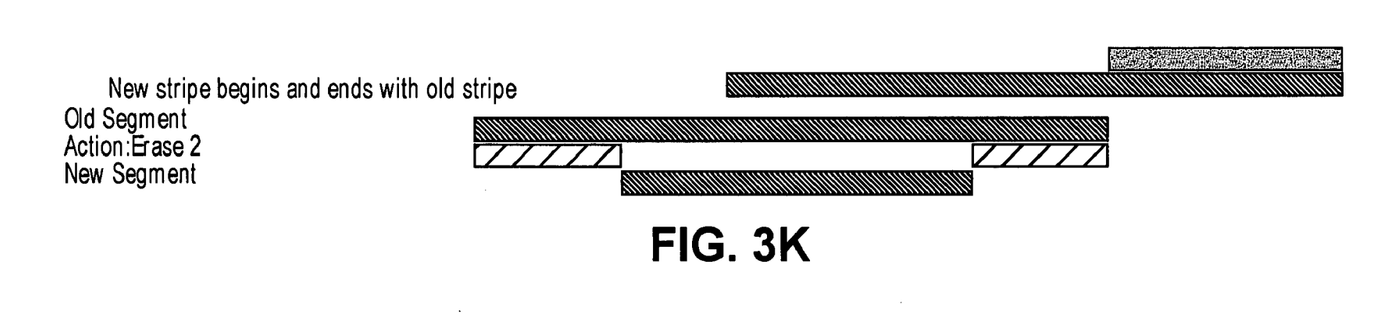

FIG. 2 is a flow chart describing the steps of an exemplary embodiment of a method for drawing a waveform in accordance with the present invention. Upon instructions from a larger software program to start drawing a waveform 28 from data points, the waveform drawing routine 12 will compare an independent line of the waveform on the display at a position X, to a line of the waveform that will succeed the existing waveform on the display at the same position X until the waveform is complete.

In the preferred embodiment of the present invention, the end points of the line are derived from a data point and its adjacent point. In another exemplary embodiment of the present invention waveform drawing routine 12 receives data corresponding to pairs of end points. In yet another exemplary embodiment of the present invention the waveform drawing routine 12 receives data that is not arranged in a sequential order.

To begin the comparing process, the waveform drawing routine, for each line to be drawn in the successor waveform, assigns the end point having the lower value to the variable SUCC_low and the end point having the higher end point to the variable SUCC_high 30. Likewise, the waveform drawing routine 12 assigns, for each line of the predecessor waveform, the variable PRED_low for the low end point of each line, and PRED_high for the high end point of each line 30.

To begin forming the successor image from the predecessor image, the waveform drawing routine begins an evaluation step 32 that makes, in a preferred embodiment of the present invention, a maximum of eleven 34, 38, 42, 46, 50, 54, 58, 62, 66, 70, 74. The waveform drawing routine, based upon the result of the inquiries 34, 38, 42, 46, 50, 54, 58, 62, 66, 70, 74, will then draw any portions of the successor line on the display that were not present in the predecessor line, maintain any portions of the predecessor line that intersect with the successor line on the display, and erase any portions of the predecessor line that do not intersect with the successor line on the display 36, 40, 44, 48, 52, 46, 60, 64, 68, 72, 76.

When the evaluation step concludes that the successor line begins and ends above the predecessor line, i.e., when the successor low end point is greater than the predecessor high end point 34, the waveform drawing routine 12 draws from the successor low end point to the successor high end point and erases from the predecessor low end point to the predecessor high end point 36.

When the evaluation step concludes that the successor line begins and ends below the predecessor line, i.e., when the successor high end point is less than the predecessor low end point 38, the waveform drawing routine 12 draws from the successor low end point to the successor high end point, and erases from the predecessor low end point to the predecessor high end point 40.

When the evaluation step concludes that the bottom of both the successor line and the predecessor line are the same, and the successor line ends above the predecessor line, i.e., when the successor low end point equals the predecessor low end point and the successor high end point is greater than the predecessor high end point 42, the waveform drawing routine 12 draws from the predecessor high end point to the successor high end point 44.

When the bottom of both the successor line and the predecessor line are the same, and when the successor line ends within the predecessor line, i.e., when the successor low end point is equal to the predecessor low end point, and the successor high end point is less than the predecessor high end point 46, the waveform drawing routine 12 erases from the successor high end point to the predecessor high end point 48.

When both the predecessor and successor lines are the same, i.e., when the successor low end point equals the predecessor low end point, and the successor high end point equals the predecessor high end point 40, the waveform drawing routine 12 does not do anything, and the predecessor line is maintained on the screen 52.

When the successor lines begins below the predecessor line, and the tops of both the successor line and the predecessor line are the same, i.e., when the successor low end point is less than the predecessor low end point and the successor high end point is equal to the predecessor high end point 54, the waveform drawing routine 12 draws from the successor low end point to the predecessor low end point 56.

When the successor line begins below the predecessor line and ends above the predecessor line, i.e., when the successor low end point is less than the predecessor low end point and the successor high end point is greater than the predecessor high end point 58, the waveform drawing routine 12 draws from the successor low end point to the predecessor low end point and draws from the predecessor high end point to the successor high end point 60.

When the successor line begins below the predecessor line and the successor line ends within the predecessor line, i.e., when the successor low end point is less than the predecessor low end point, and the successor high end point is less than the predecessor high end point 62, the waveform drawing routine 12 draws from the successor low end point to the predecessor low end point and erases from the successor high end point to the predecessor high end point 64.

When the successor line begins within the predecessor line and the tops of both the successor line and the predecessor line are the same, i.e., when the successor low end point is greater than the predecessor low end point and when the successor high end point is equal to the predecessor high end point 66, the waveform drawing routine 12 erases from the predecessor low end point to the successor low end point 68.

When the successor line begins within the predecessor line, and ends above the predecessor line, i.e., when the successor low end point is greater than the predecessor low end point and when the successor high end point is greater than the predecessor high end point 70, then the waveform drawing routine 12 draws from the predecessor high end point to the successor high end point and erases from the predecessor low end point to the successor low end point 72.

When the successor line begins above the predecessor line and ends within the predecessor line, i.e., when the successor low end point is greater than the predecessor low end point and when the successor high end point is less than the predecessor high end point 74, the waveform drawing routine erases from the predecessor low end point to the successor low end point and erases from the successor high end point to the predecessor high end point 76.

In step 78, the waveform drawing routine then moves to a next axial position of X+1 78, and performs the evaluation step 32 again until each axial position has been evaluated 80. When each of the axial positions of the display 20 have been evaluated, the waveform drawing routine 12 saves the successor array, that has been subjected to the erase, draw and "do nothing" operations to the predecessor array, and the formation of the successor waveform from the predecessor waveform 82 is complete. The waveform drawing routine may thereby be exited until the next instruction to begin the drawing of a waveform.

It should be understood by one of ordinary skill in the art that when the waveform drawing routine 12 draws from an end point of a predecessor line, that it does not redraw the end point of the predecessor line, and when the waveform drawing routine 12 erases to the end point of a successor line, it does not erase the end point of the successor line.

FIGS. 3(*a*)–(*k*) illustrate how a line of a predecessor waveform is transformed into a line or a successor waveform through erase, draw and "do nothing" operations. For purposes of illustration, the vertical lines are shown horizontally.

FIG. 3(*a*) corresponds to steps 34 and 36 when the successor line begins and ends above the predecessor line.

FIG. 3(*b*) corresponds to steps 38 and 40 when the successor line begins and ends below the predecessor line.

FIG. 3(*c*) corresponds with steps 42 and 44 when the successor line begins at the same point as the predecessor but ends above the predecessor line.

FIG. 3(*d*) corresponds to steps 46 and 48 when the successor line begins at the same point as the predecessor line and ends within the predecessor line.

FIG. 3(*e*) corresponds to steps 50 and 52 when the predecessor line is the same as the successor line to be drawn.

FIG. 3(*f*) corresponds to steps 54 and 56 when the successor line begins below the old line and ends at the top of the predecessor line.

FIG. 3(*g*) corresponds to steps 58 and 60 when the successor line begins below the predecessor line and ends above the predecessor line.

FIG. 3(*h*) corresponds to steps 62 and 64 when the successor line begins below the predecessor line and ends within the predecessor line.

FIG. 3(*i*) corresponds to steps 66 and 68 when the successor line begins within the predecessor line and ends at the same point as the predecessor line.

FIG. 3(*j*) corresponds to steps 70 and 72 when the successor line begins within the predecessor line and ends above the predecessor line.

FIG. 3(*k*) corresponds to steps 74 and 76 when the successor line begins within the predecessor line and ends within the predecessor line.

A method for image drawing, in accordance with the present invention, avoids redundant plotting of pixels when replacing an existing image, for example a waveform, with a new image, for example a new waveform, by determining which one of eleven sequences of drawing and/or erasing results in the modification of the least number of pixels. Accordingly, a method for image drawing, in accordance with the present invention, involves fewer steps, and is less complex than some conventional methods of waveform drawing.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A method for waveform drawing to reduce waveform flicker arising from drawing a successor image after a drawn predecessor image, comprising:

receiving an array of predecessor image data points, the array of predecessor image data points containing a predecessor high end point and a predecessor low end point, defining an upper bound of a predecessor line and a lower bound of the predecessor line, respectively, wherein each element of a domain of the predecessor array corresponds to a horizontal displacement and each element of a range of the predecessor array corresponds to a vertical displacement;

receiving an array of successor image data points, the array of successor image data points containing a successor high end point and a successor low end point, defining an upper bound of a successor line and a lower bound of the successor line, respectively, wherein each element of a domain of the successor array corresponds to a horizontal displacement and each element of a range of the successor array corresponds to a vertical displacement;

comparing the high end point and low end point of the successor line to the high end point and low end point of the predecessor line, respectively; and maintaining portions of the predecessor line on a display that are determined in the comparing step to intersect with the successor line.

2. The method of claim 1, further comprising:

drawing portions of the successor line on the display that are not present in the predecessor line; and erasing portions of the predecessor line on the display that do not intersect with the successor line.

3. The method of claim 2, wherein the drawing step includes drawing from the successor low end point to the successor high end point, and wherein the erasing step includes erasing from the predecessor low end point to the predecessor high end point, when the successor low end point is greater than the predecessor high end point.

4. The method of claim 2, wherein the drawing step includes drawing from the successor low end point to the successor high end point, and wherein the erasing step includes erasing from the predecessor low end point to the predecessor high end point, when the successor high end point is less than the predecessor low end point.

5. The method of claim 2, wherein the drawing step includes drawing from the predecessor high end point to the successor high end point, when the successor low end point is equal to the predecessor low end point and the successor high end point is greater than the predecessor high end point.

6. The method of claim 2, wherein the erasing step includes erasing from the successor high end point to the predecessor high end point, when the successor low end point is equal to the predecessor low end point and the successor high end point is less than the predecessor high end point.

7. The method of claim 2, wherein the drawing step does not do anything, when the predecessor low end point is equivalent to the successor low end point and the successor high end point is equivalent to the predecessor high end point.

8. The method of claim 2, wherein the drawing steps includes drawing from the successor low end point to the predecessor low end point, when the successor low end point is less than the predecessor low end point and the successor high end point is equal to the predecessor high end point.

9. The method of claim 2, wherein the drawing step includes drawing from the successor low end point to the predecessor low end point and drawing from the predecessor high end point to the successor high end point, when the successor low end point is less than the predecessor low end point and the successor high end point is greater than the predecessor high end point.

10. The method of claim 2, wherein the drawing step includes drawing from the successor low end point to the predecessor low end point, and wherein the erasing step includes erasing from the successor high end point to the predecessor high end point, when the successor low end point is less than the predecessor low end point and the successor high end point is less than the predecessor high end point.

11. The method of claim 2, wherein the erasing step includes erasing from the predecessor low end point to the successor low end point, when the successor low end point is greater than the predecessor low end point and when the successor high end point is equal to the predecessor high end point.

12. The method of claim 2, wherein the drawing step includes drawing from the predecessor high end point to the successor high end point, and wherein the erasing step includes erasing from the predecessor low end point to the successor low end point, when the successor low end point is greater than the predecessor low end point and when the successor high end point is greater than the predecessor high end point.

13. The method of claim 2, wherein the erasing step includes erasing from the predecessor low end point to the successor low end point and erasing from the successor high end point to the predecessor high end point, when the successor low end point is greater than the predecessor low end point and the successor high end point is less than the predecessor high end point.

14. An apparatus for waveform drawing to reduce waveform flicker arising from drawing a successor image after a drawn predecessor image, comprising:

a predecessor image data points array buffer, containing a predecessor high end point and a predecessor low end point, defining an upper bound of a predecessor line and a lower bound of the predecessor line, respectively, wherein each element of a domain of the predecessor array corresponds to a horizontal displacement and each element of a range of the predecessor array corresponds to a vertical displacement;

a successor image data points array buffer in communication with the predecessor image data points array buffer, containing a successor high end point and a successor low end point, defining an upper bound of a successor line and a lower bound of the successor line, respectively, wherein each element of a domain of the successor array corresponds to a horizontal displacement and each element of a range of the successor array corresponds to a vertical displacement;

a comparator in communication with the predecessor image data points array buffer and the successor image data points array buffer that compares the high end point and low end point of the successor line to the high end point and low end point of the predecessor line, respectively; and a predecessor array updater in communication with the comparator that erases portions of the predecessor line that are determined by the comparator to not intersect with the successor line.

15. The apparatus of claim 14, further comprising:

an animations operator that draws portions of the successor line that are determined by the comparator to not be present in the predecessor line.

16. The system of claim 14, further comprising a storage medium coupled to the comparator.

17. The system of claim 16, wherein the storage medium is at least one of a hard disk drive, a CD, and a diskette.

18. The system of claim 16, wherein the storage medium is one of a random access memory device and a read-only memory device.

19. A system for waveform drawing to reduce waveform flicker arising from drawing a successor image after a drawn predecessor image, comprising:

means for receiving an array of predecessor image data points, the array of predecessor image data points containing a predecessor high end point and a predecessor low end point, defining an upper bound of a predecessor line and a lower bound of the predecessor line, respectively, wherein each element of a domain of the predecessor array corresponds to a horizontal displacement and each element of a range of the predecessor array corresponds to a vertical displacement;

means for receiving an array of successor image data points, the array of successor image data points containing a successor high end point and a successor low end point, defining an upper bound of a successor line and a lower bound of the successor line, respectively, wherein each element of the domain of a successor array corresponds to a horizontal displacement and each element of a range of the successor array corresponds to a vertical displacement;

means for comparing the high end point and low end point position of the successor line to the high end point and low end point position of the predecessor line, respectively; and means for maintaining portions of the predecessor line on a display that are determined by the comparing means to intersect with the successor line.

20. The system of claim 19, further comprising:

means for drawing portions of the successor line on the display that were not present in the predecessor line; and means for erasing portions of the predecessor line that do not intersect with the successor line.

21. A method for waveform drawing to reduce waveform flicker arising from drawing a successor image after a drawn predecessor image, comprising:

receiving an array of predecessor data points, wherein the predecessor data points correspond to plotted pixels of an existing waveform on a display;

receiving an array of successor data points, wherein the successor data points correspond to pixels to be plotted of a successor waveform that will succeed the existing waveform on the display;

plotting the pixels to be plotted of the successor waveform, which do not correspond to the plotted pixels of the existing waveform; and erasing the plotted pixels of the existing waveform that do not correspond to the pixels to be plotted of the successor waveform, wherein the above steps reduce waveform flicker during plotting.

22. The method of claim 21, wherein at least one of the array of predecessor image data points and the array of successor image data points contains a pair of data points.

23. The method of claim 22, wherein the pair of data points corresponds to at least one of the predecessor image data points and successor image data points and an adjacent data point to the at least one of the predecessor image data points and successor image data points.

* * * * *